(12) United States Patent
Che et al.

(10) Patent No.: US 12,196,358 B2
(45) Date of Patent: Jan. 14, 2025

(54) ROTATING ASSEMBLY

(71) Applicants: Xiaoling Che, Hubei (CN); Jinyan Duan, Guangdong (CN)

(72) Inventors: Xiaoling Che, Hubei (CN); Jinyan Duan, Guangdong (CN)

( * ) Notice: Subject to any disclaimer, the term of this patent is extended or adjusted under 35 U.S.C. 154(b) by 0 days.

(21) Appl. No.: 18/383,891

(22) Filed: Oct. 25, 2023

(65) Prior Publication Data
US 2024/0052972 A1 Feb. 15, 2024

Related U.S. Application Data

(63) Continuation-in-part of application No. 29/903,457, filed on Sep. 24, 2023, and a continuation-in-part of application No. 18/235,416, filed on Aug. 18, 2023, and a continuation-in-part of application No. 17/829,359, filed on Jun. 1, 2022, and a continuation-in-part of application No. 29/818,458, filed on Dec. 9, 2021, and a continuation-in-part of application No. 17/505,587, filed on Oct. 19, 2021, now Pat. No. 11,890,551.

(30) Foreign Application Priority Data

Sep. 26, 2021 (CN) .......................... 202111131554.1
Sep. 26, 2021 (CN) .......................... 202122334815.1

(51) Int. Cl.
*F16M 11/20* (2006.01)
*F16C 19/06* (2006.01)

(52) U.S. Cl.
CPC ......... *F16M 11/2014* (2013.01); *F16C 19/06* (2013.01)

(58) Field of Classification Search
CPC .......... F16M 11/2014; F16M 2200/028; F16C 19/06; G03B 17/561; H04N 5/2252
See application file for complete search history.

(56) References Cited

U.S. PATENT DOCUMENTS

| | | | | |
|---|---|---|---|---|
| 2,648,579 | A * | 8/1953 | Slyter ...................... | A47C 3/18 |
| | | | | 384/615 |
| 4,549,714 | A * | 10/1985 | Busch .................... | A47G 23/08 |
| | | | | 248/349.1 |
| 4,635,894 | A * | 1/1987 | Sammons .............. | F16M 11/08 |
| | | | | 384/615 |
| 4,659,050 | A * | 4/1987 | Tabayashi ............. | F16C 33/588 |
| | | | | 248/349.1 |
| 4,822,183 | A * | 4/1989 | Lederman .............. | F16C 19/10 |
| | | | | 384/477 |

(Continued)

FOREIGN PATENT DOCUMENTS

EP 1659021 B1 9/2011

*Primary Examiner* — Nkeisha Smith

(57) ABSTRACT

A rotating assembly, adapted for supportively disposed between two surfaces of two objects so as to allow the two objects rotating with respect to each other, includes a frame body comprising a supporting turner coupled at the first object and having an inner circumferential surface and a turner frame coupled at the second object and having an outer circumferential surface and a rotor mechanism coupled between the turner frame and the supporting turner to enable the turner frame to be coaxially rotated with respect to the supporting turner, thereby enabling the second object to be rotated related to the first object.

22 Claims, 14 Drawing Sheets

(56) References Cited

U.S. PATENT DOCUMENTS

| | | | | |
|---|---|---|---|---|
| 5,174,538 | A * | 12/1992 | Okada | F16C 33/38 |
| | | | | 384/615 |
| 5,779,309 | A * | 7/1998 | Lu | A47C 3/18 |
| | | | | 297/344.26 |
| 5,810,441 | A * | 9/1998 | Ezuka | B60N 2/143 |
| | | | | 297/344.22 |
| 6,021,989 | A * | 2/2000 | Morita | B60N 2/146 |
| | | | | 297/344.26 |
| 6,161,806 | A * | 12/2000 | Crosson | A47B 11/00 |
| | | | | 248/371 |
| 6,997,512 | B1 * | 2/2006 | Yu | A47C 3/18 |
| | | | | 297/344.21 |
| 7,065,828 | B2 * | 6/2006 | Sorensen | B60B 33/0007 |
| | | | | 16/21 |
| 7,191,458 | B2 | 3/2007 | Tokumitsu | |
| 7,708,239 | B2 | 5/2010 | Watanabe et al. | |
| 7,798,067 | B2 * | 9/2010 | Starnes | E04H 6/40 |
| | | | | 104/44 |
| 7,967,383 | B2 * | 6/2011 | LaPointe | A47C 3/18 |
| | | | | 297/344.26 |
| 8,315,143 | B2 | 11/2012 | Frederick et al. | |
| 8,864,592 | B2 | 10/2014 | Baxter et al. | |
| 9,449,640 | B2 | 9/2016 | Kreisel et al. | |
| 9,579,995 | B2 * | 2/2017 | Haller | B60N 2/16 |
| 10,688,889 | B2 * | 6/2020 | Feng | B60N 2/42736 |
| 2009/0045311 | A1 * | 2/2009 | Seyedin | F16M 11/08 |
| | | | | 248/349.1 |
| 2010/0101461 | A1 | 4/2010 | Brault et al. | |
| 2014/0224952 | A1 * | 8/2014 | Mosley | A47G 23/08 |
| | | | | 248/349.1 |

\* cited by examiner

ROTATING ASSEMBLY

CROSS REFERENCES AND PRIORITIES

This application is a continuation-in-part of U.S. patent application Ser. No. 17/505,587 filed on Oct. 19, 2021 which claims the benefit of Chinese Patent Application Nos. 2021111315541 and 2021223348151 filed on Sep. 26, 2021, U.S. patent application Ser. No. 17/829,359 filed on Jun. 1, 2022, U.S. patent application Ser. No. 18/235,416 filed on Aug. 18, 2023, U.S. design application Ser. No. 29/818,458 filed on Dec. 9, 2021, and U.S. design application Ser. No. 29/903,457 filed on Sep. 24, 2023, the contents of each of which are incorporated by reference in their entirety.

BACKGROUND OF THE PRESENT INVENTION

Field of Invention

The present invention relates to rotation mechanism of turntable, and more particular to a rotating assembly with minimum thickness and durable structure adapted for being supportively disposed between two surfaces of two objects so as to allow the two objects rotating with respect to each other.

Description of Related Arts

Turntable is a common component to be constructed in many devices and apparatuses, such as display device, media disc player, optical device, furniture, game playing platform, deliver apparatus in production line, and etc. Central rotation mechanism is equipped in turntable for displaying purpose as illustrated in U.S. Pat. Nos. 9,449,640 and 7,708,239. Various central rotation mechanisms are equipped in record turntable as disclosed in U.S. Pat. No. 8,315,143 and optical disk as disclosed in U.S. Pat. No. 7,191,458. European Patent No. 1,659,021 discloses a lockable turntable equipped in furniture embodying in auto chairs to enable rotation relative to the underframe around a vertical axis, wherein a circular turning pattern of a release lever is converted to a radial motion pattern of the locking pawls by curved grooves of a cam disc. U.S. Pat. No. 7,798,067 teaches a thin turntable for a heavy object as a car including ground-engaging load surface facing each other while the load-supporting platform being supported off the ground-engaging member by an intermediate load transfer unit. U.S. Pat. No. 8,864,592 discloses a turntable racing system equipping planetary rotors in drive mechanism operable to rotate the first turntable about a rotation axis extending vertically through the first turntable.

However, as mentioned above, most of the rotation mechanisms are specifically made for specific device and apparatus with various structures. There is a demand in the market to have a rotating assembly with standard mechanism, relatively low cost and durable structure that is appliable in various configurations for allowing relative rotation between two parallel surfaces of two objects.

SUMMARY OF THE PRESENT INVENTION

The invention is advantageous in that it provides a rotating assembly with as less component as possible while providing relative strong and durable structure which can be equipped in various industrial products to allow relative rotation between two surfaces of two objects.

Another advantage of the invention is to a rotating assembly configured to be supportively mounted between two surfaces of two objects so as to allow the two objects rotating with respect to each other.

Another advantage of the invention is to a rotating assembly which has a relatively thin thickness for ease of mounting between two parallel surfaces ensuring one of the surfaces to turn about the other surface along an axis of the rotating assembly.

Another advantage of the invention is to a rotating assembly, having a ring shape, which is adapted to be directly mounted on a first surface of a first object through a mounting device thereof, wherein a second surface of a second object can rest on the rotating assembly and rotate respect to the first surface of the first object.

In one aspect, the present disclosure provides a rotating assembly comprising a first rotating frame having a first rolling surface, a second rotating frame having a second rolling surface and a plurality of rotors coupled between the first rolling surface of the first rotating frame and the second rolling surface of the second rotating frame to enable the first rotating frame to be coaxially rotated with respect to the second rotating frame.

Further, wherein the first rotating frame further comprises an outer circumferential surface and the second rotating frame further comprises an inner circumferential surface engaged with the outer circumferential surface of the second rotating frame via the rotors to enable the first rotating frame to be coaxially rotated with respect to the second rotating frame.

Further, wherein the first rotating frame has a first member and a second member connected with the first member, the second rotating frame is arranged facing the second member with spacing for rotating related with the first rotating frame.

Further, wherein the first member comprises a fixing portion and the second member surrounding the fixing portion and connected with the fixing portion of the first member.

Further, wherein the first rotating frame further comprises a receiving space formed by the fixing portion of the first member spaced apart from the second member for accommodating glue for fixing the first member and the second member firmly.

Further, wherein the first member further comprises an extending portion integrally extending from the fixing portion, the second rotating frame surrounding the extending portion of the first member for enable the first rotating frame being coaxially rotated with respect to the second rotating frame.

Further, wherein the extending portion comprises a supporting wall extending from the fixing portion and an engaging wall extending from the supporting wall and mounted on the second member.

Further, wherein the extending portion comprises a supporting wall extending from the fixing portion and a retaining lip extending from the supporting wall for forming a rotor chamber together with the supporting wall, the second rotating frame further comprises a locking lip received in the rotor chamber and locked by the retaining lip.

Further, wherein the rotating assembly further comprises a complementary conformation for retaining the rotors.

Further, wherein complementary conformation having a projecting rib provided on the second rotating frame and a receiving slot provided on the first rotating frame for receiving the projecting rib.

Further, wherein the first rotating frame has a flat middle part opposite to the first rolling surface and a projection of the middle part is partly overlapped with that of the first rolling surface in a thickness direction of the rotating assembly.

Further, wherein the second rotating frame has a flat pressing part opposite to the second rolling surface and a projection of the pressing part is partly overlapped with that of the second rolling surface in the thickness direction of the rotating assembly.

Further, wherein the rotating assembly further comprises a retainer unit for holding the rotors.

Further, the retainer unit comprises a retaining ring, a plurality of retaining holes drilled completely through the corresponding retaining ring, a plurality of retaining base intervally and integrally protruded on one side of the retaining ring and surrounding the corresponding retaining holes, and a plurality of retaining openings provided on the retaining base and integrally and smoothly connected with the retaining holes.

Further, the diameter of the retaining openings is slightly smaller than that of the corresponding rotors for locking the plurality of rotors in position respectively while allowing the plurality of rotors in a free rolling manner.

Further, the first and second rolling surfaces form a rolling track channel for allowing the rotors directly rotatably disposed thereon, the retainer unit comprises a plurality of dividers configured to be received in the rolling track channel in such a manner that at least one of the rotors is placed between two of dividers so as to spacedly and intervally retain the rotor such that the rotor is free to roll on the first and second rolling surfaces.

Further, wherein diameters of the dividers are smaller than that of the rotors.

Further, wherein at least one of the dividers has a hollow elongated cylinder shape.

Further, wherein the second rotating frame further comprises a third surface portion facing the first rotating frame, a fourth surface portion opposite to the third surface portion, a receiving portion extending from the third surface portion towards the fourth surface portion for receiving the retainer unit.

Further, wherein the receiving portion comprises a bottom portion and a surrounding wall extending from the bottom portion, the second rolling surface extends from the bottom portion of the receiving portion towards the fourth surface portion.

In another aspect, the present disclosure provides a rotating assembly, for being supportively disposed between a first object and a second object opposite to the first object for allowing the two objects rotating with respect to each other, comprising a frame body comprising a second rotating frame coupled at the first object and having a second rolling surface and a first rotating frame coupled at the second object and having a first rolling surface and a rotor mechanism coupled between the first and second rolling surfaces to enable the first rotating frame to be coaxially rotated with respect to the second rotating frame.

Further, wherein the first rotating frame is rotatably coupled to the second rotating frame by the rotor mechanism and comprises an outer circumferential surface and the second rotating frame further comprises an inner circumferential surface arranged facing the outer circumferential surface of the first rotating frame and engaged with the outer circumferential surface of the second rotating frame via the rotor mechanism to enable the first rotating frame to be coaxially rotated with respect to the second rotating frame.

Further, wherein the first rotating frame has a first member coupled to the second object and a second member connected with the first member, the second rotating frame is coupled with the first object and arranged facing the second member with spacing for rotating related with the first rotating frame.

Further, wherein the first member comprises a fixing portion coupled to the second object and the second member surrounding the fixing portion and connected with the fixing portion of the first member.

Further, wherein the first rotating frame has a flat middle part opposite to the first rolling surface and the weight of the second object is directly pressed onto the middle part.

Further, wherein the second rotating frame has a flat pressing part opposite to the second rolling surface and mounted on the first object.

In the other aspect, the present disclosure provides a rotating assembly comprising a first rotating frame having an upper concave with a first rolling surface, a second rotating frame having a lower concave with a second rolling surface and a plurality of rotors coupled between the first rolling surface of the first rotating frame and the second rolling surface of the second rotating frame to enable the first rotating frame to be coaxially rotated with respect to the second rotating frame.

Further, wherein the first rotating frame is rotatably coupled to the second rotating frame by the rotors and comprises an outer circumferential surface and the second rotating frame further comprises an inner circumferential surface arranged facing the outer circumferential surface of the first rotating frame and engaged with the outer circumferential surface of the second rotating frame via the rotors to enable the first rotating frame to be coaxially rotated with respect to the second rotating frame.

Further, wherein the first rotating frame further a fixing portion, a supporting wall extending from the fixing portion, an engaging wall extending from the supporting wall, a retaining lip extending from the supporting wall and spaced apart from the engaging wall for forming a rotor chamber together with the engaging wall, the second rotating frame further comprises a locking lip received in the rotor chamber and locked by the retaining lip.

Further, wherein the first rotating frame has a first member and a second member connected with the first member, the second rotating frame is arranged facing the second member with spacing for rotating related with the first rotating frame, the rotor chamber is formed by the engaging wall, the retaining lip and the second member.

Still further objects and advantages will become apparent from a consideration of the ensuing description and drawings. These and other objectives, features, and advantages of the present invention will become apparent from the following detailed description, the accompanying drawings, and the appended claims.

Figure 1:
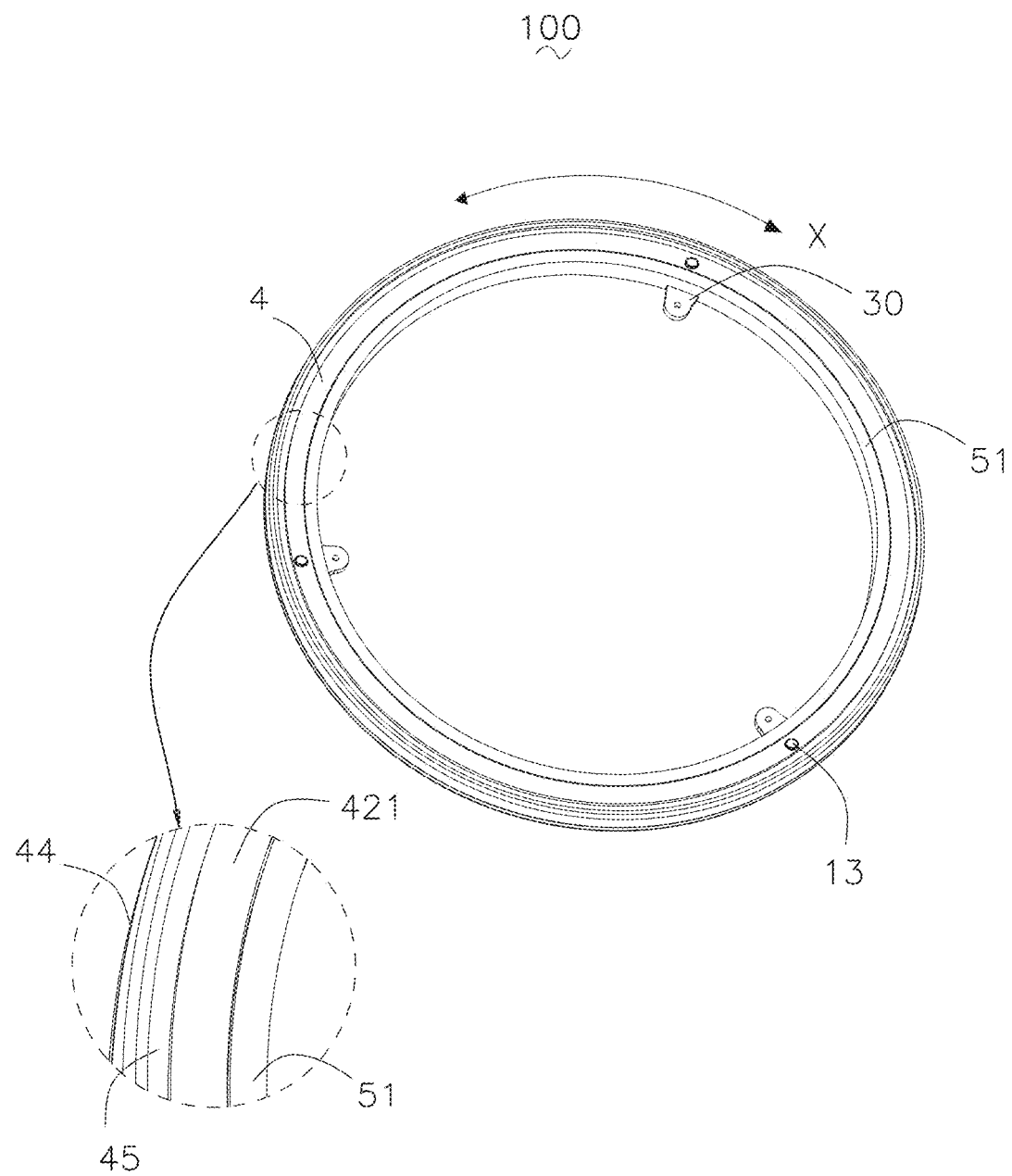
FIG. 1 is an illustrative isometric view of a rotating assembly according to a first embodiment of the present invention.

The drawings, described above, are provided for purposes of illustration, and not of limitation, of the aspects and features of various examples of embodiments of the invention described herein. The drawings are not intended to limit the scope of the claimed invention in any aspect. For simplicity and clarity of illustration, elements shown in the drawings have not necessarily been drawn to scale and the dimensions of some of the elements may be exaggerated relative to other elements for clarity.

DETAILED DESCRIPTION OF THE PREFERRED EMBODIMENTS

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Further, this description is not to be considered as limiting the scope of the embodiments described herein in any way, but rather as merely describing implementation of the one or more embodiments described herein.

Referring to FIG. 1 to FIG. 12, a rotating assembly 100 according to a first embodiment of the present invention is illustrated, wherein the rotating assembly 100 is configured for being supportively disposed between two contacting surfaces of two objects, i.e., a first object O1 and a second object O2, so as to allow the two objects rotating with respect to each other. The rotating assembly 100 comprises a hollow frame body 10 and a rotor mechanism 20 rotatably retained within the frame body 10. The frame body 10 comprises a first rotating frame 3 and a second rotating frame 4 rotatably coupled to the first rotating frame 3 via the rotor mechanism 20. The rotor mechanism 20 is coupled between the first rotating frame 3 and the second rotating frame 4 and comprises a plurality of ball-shape rotors 21 and a retainer unit 22 for holding the rotors 21.

Figure 10:
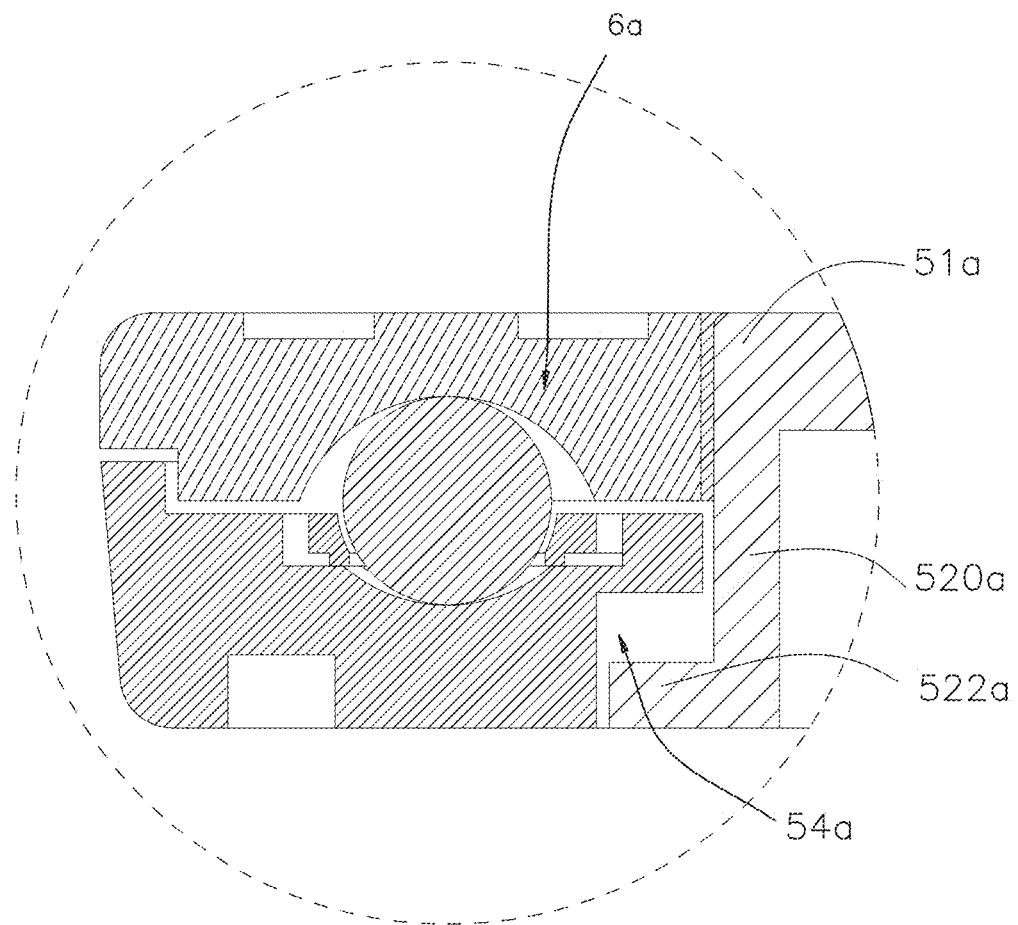
FIG. 10 illustrates an alternative mode of a first member of the rotating assembly shown in FIG. 1.
Figure 11:
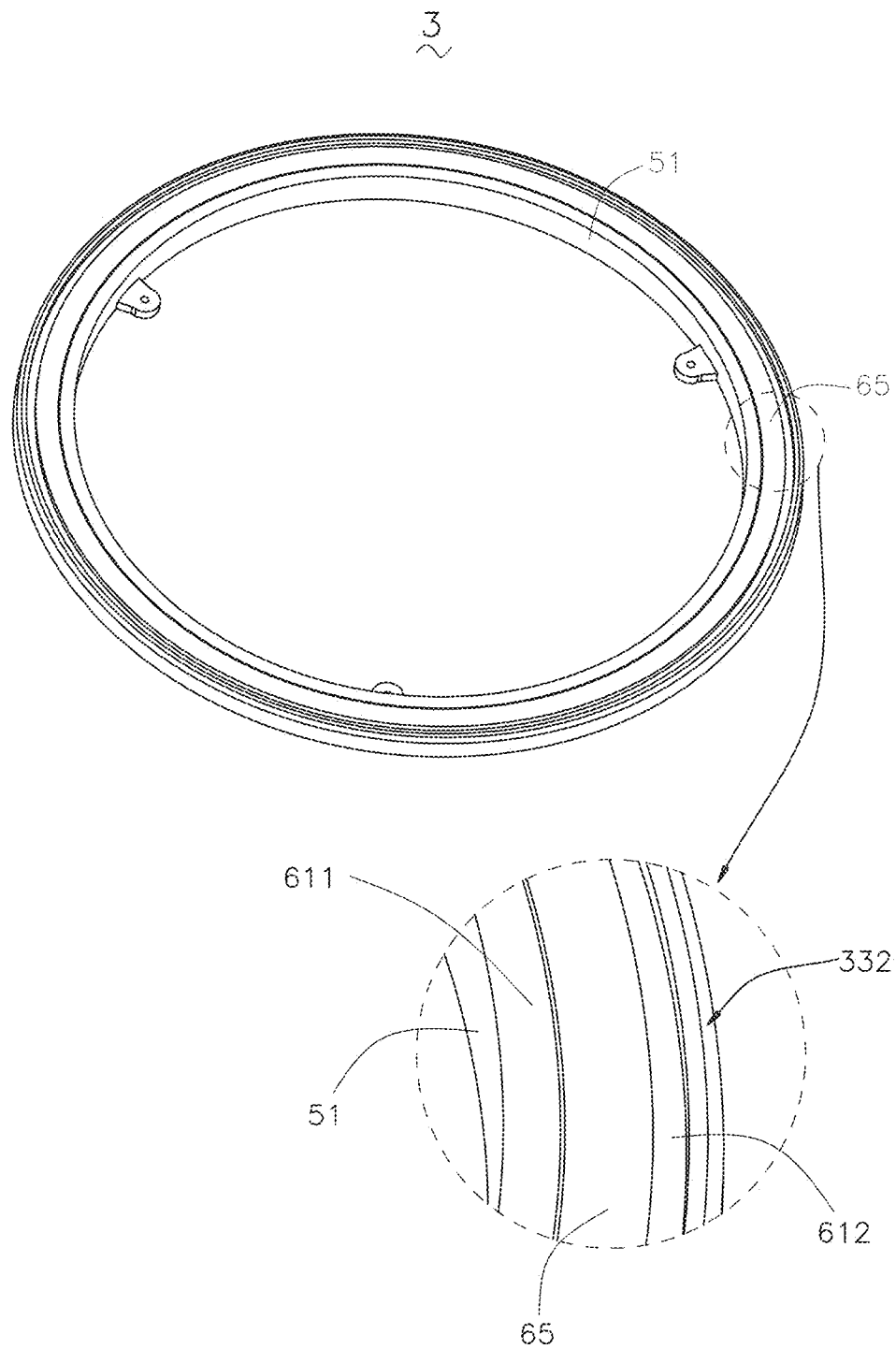
FIG. 11 is an illustrative isometric view of the first member and a second member of the rotating assembly shown in FIG. 1.
Figure 12:
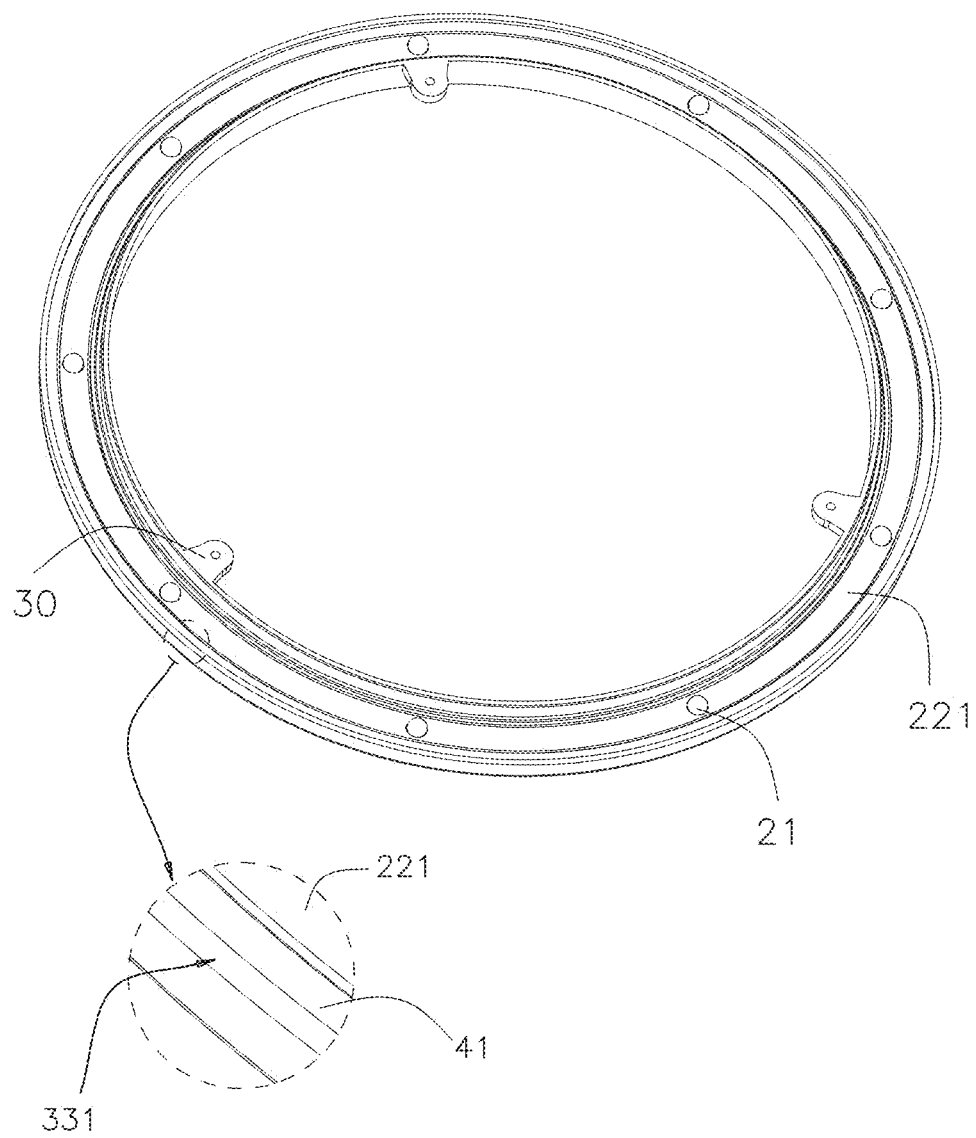
FIG. 12 is an illustrative isometric view of the rotating assembly shown in FIG. 1, the second member thereof being removed away.
Figure 13:
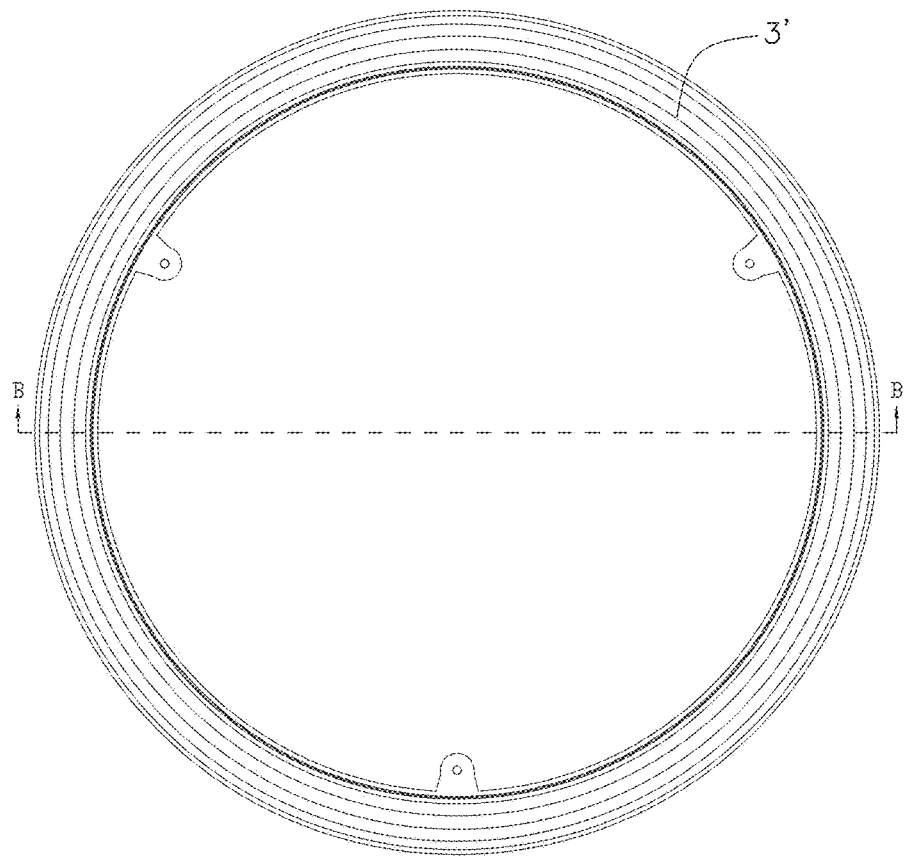
FIG. 13 is a front elevational view of a rotating assembly according to a second embodiment of the present invention.
Figure 14:
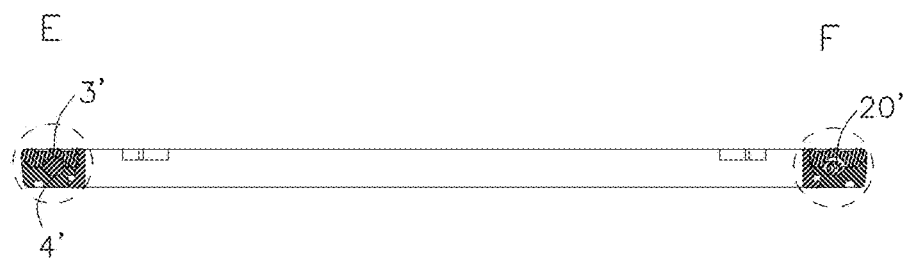
FIG. 14 is a cross-sectional view of the rotating assembly taken along line B-B of FIG. 13.
Figure 15:
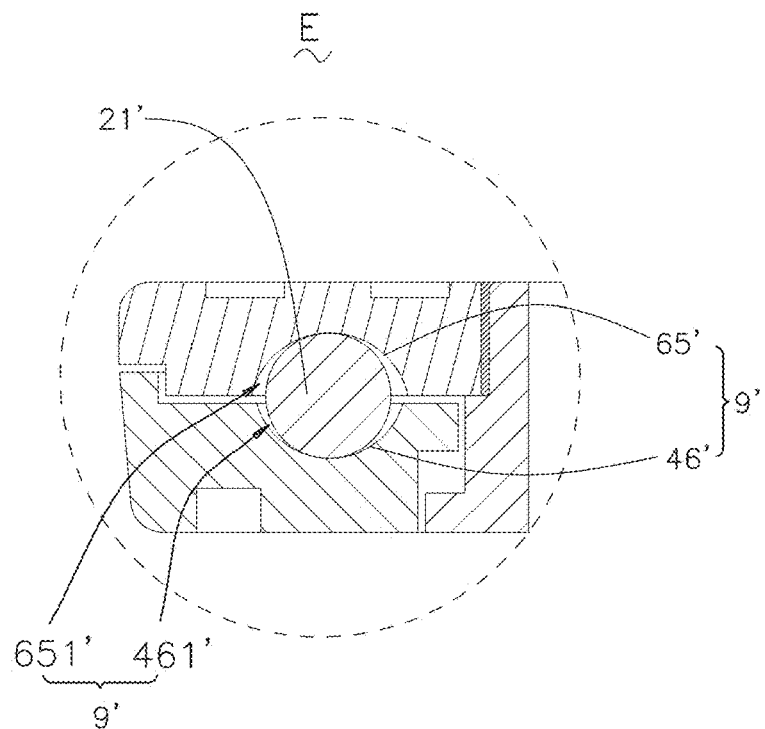
FIG. 15 is an enlarged view of Part E in FIG. 13.
Figure 16:
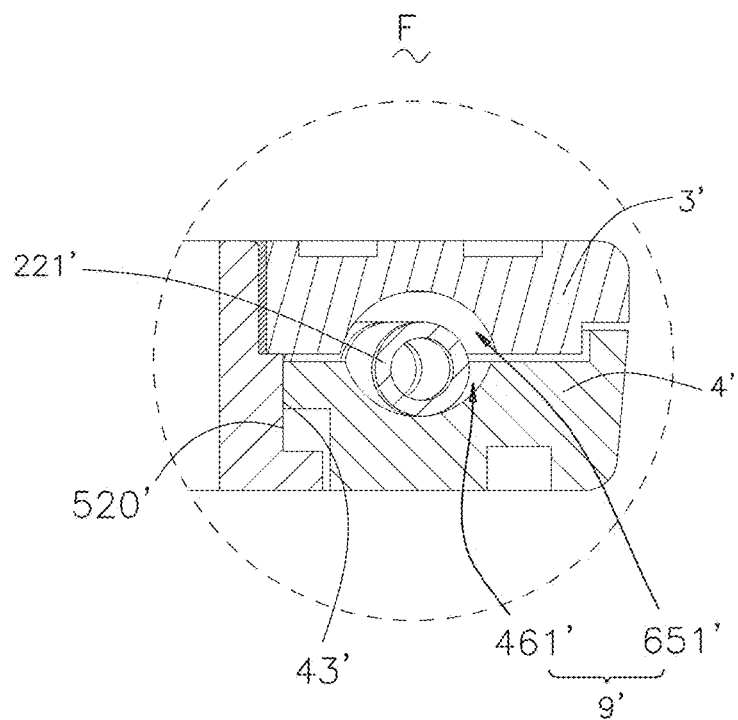
FIG. 16 is an enlarged view of Part F in FIG. 13.
Figure 17:
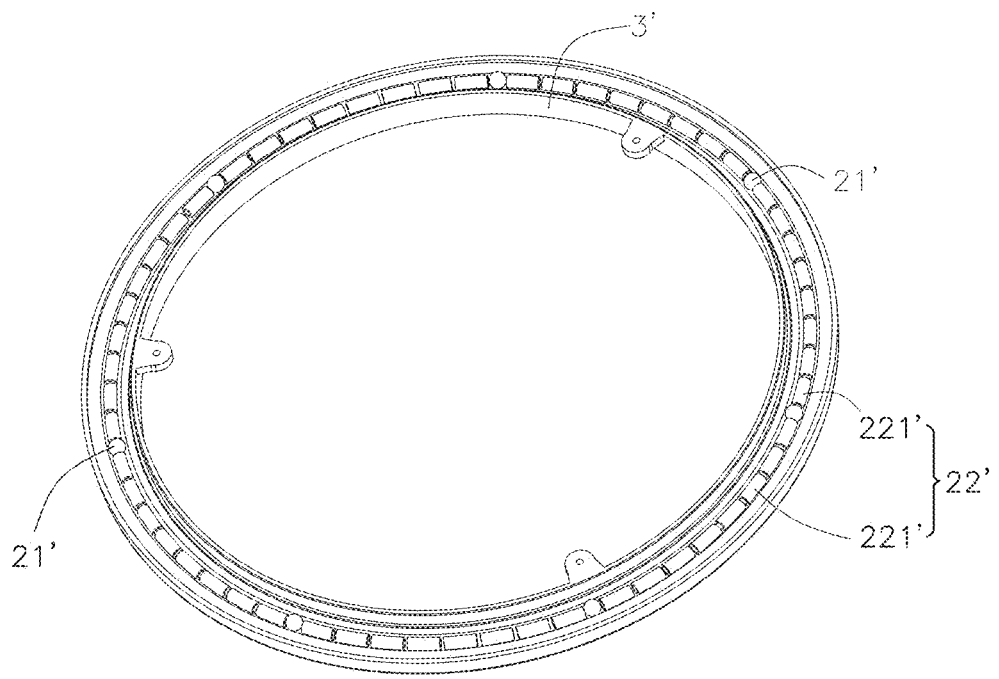
FIG. 17 is an illustrative isometric view of the rotating assembly shown in FIG. 13, a second member thereof being removed away.

The first rotating frame 3 is a type of two-piece and comprises a first member 5 and a second member 6 connected with the first member 5. The first member 5, ring shaped, comprises a fixing portion 51, an extending portion 52 integrally extending from the fixing portion 51 and forming a circular opening 50 together with the fixing portion 51. The extending portion 52 comprises a supporting wall 520 extending from the fixing portion 51 and surrounding the opening 50, an engaging wall 521 extending from the supporting wall 520 and away from the circular opening 50 for being mounted on the second member 6 and a retaining lip 522 extending from the supporting wall 520 for forming a rotor chamber 54 together with the engaging wall 521 and the second member 6. An extending direction of the engaging wall 521 is substantially same as that of the retaining lip 522. It is optional that the engaging wall can be omitted. Referring to FIG. 10, a retaining lip 522a integrally extends from the supporting wall 520a for forming a rotor chamber 54a together with the supporting wall 520a and the second member 6a.

The second member 6 is substantially ring-shaped and connected with the first member 5. The second member 6 comprises a first surface portion 61 facing towards the second rotating frame 4, a second surface portion 62 opposite to the first surface portion 61, an circular inner sidewall 63 connected with one end of the first and second surface portions 61, 62, an circular outer sidewall 64 connected with another end of the first and second surface portions 61, 62, a first rolling surface 65 extending from the first surface portion 61 towards the second surface portion 62 for dividing the first surface portion 61 into a first side 611 near the first member 5 and a second side 612 far away from the first member 5. The second surface portion 62 comprises a first recess 621 extending from the second surface portion 62 towards the first surface portion 61 for dividing the second surface portion 62 into a first part 623 near the fixing portion 51 of the first member 5 and a second part 626 far away from the first part 623, thereby reducing a weight of the first rotating frame 3. It is optional that the second surface portion 62 further comprises a second recess 622 spaced apart from the first recess 621 and extending from the second surface portion 62 towards the first surface portion 61 for dividing the second part 626 into a flat middle part 624 positioned between the first and second recesses 621, 622 and opposite to the first rolling surface 65 and an edge part 625 far away from the first member 5. The first rolling surface 65 is a ring-shape concave with a C-shaped cross section facing towards the second rotating frame 4. It is optional that the cross section of the first rolling surface 65 may be U-shaped, cup-shaped, V-shaped or other similar shapes, as long as it can be used to allow the plurality of rotors 21 being retained and rolling thereon. Depths of the first and second recesses are substantially same to each other. The second member 6 is made of plastic and is manufactured by injection molding. At least one recess is provided on the second member, so that the manufacture of the second member is simple and low-cost and the weight of the second member can be reduce for ensuring the second rotating frame is strong enough to support the first rotating frame.

To assemble the first rotating frame 3 of the present invention, the engaging wall 521 of the first member 5 is mounted on the first side 611 of the second member 6 by normal means such as glue or adhesive. In order to fix the first member 5 on the second member 6 firmly, the first rotating frame 3 further defines a receiving space 31 formed by the fixing portion 51 of the first member 5 spaced apart from the inner sidewall 63 of the second member 6. In other words, with the configuration of the receiving space 31, it is convenient for injecting and accommodating glue 32 so that the first member 5 can be fixed with the second member 6 firmly.

The second rotating frame 4 is arranged facing the second member 6 of the first rotating frame 3 with spacing and rotatably coupled with the second member 6 of the first rotating frame 3 to enclose the rotors 21 for rotating related with the first rotating frame 3. The second rotating frame 4 comprises a third surface portion 41 facing the second member 6, a fourth surface portion 42 opposite to the third surface portion 41, an inner circumferential surface 43 connected with the third and fourth surface portions 41, 42, an circular outer connecting wall 44 opposite to the inner circumferential surface 43 and connected with the third and fourth surface portions 41, 42, a third recess 45 extending from the fourth surface portion 42 towards the third surface portion 41 for dividing the fourth surface portion 42 into a flat pressing part 421 near the first member 5 and an outer rim 422 far away from the first member 5 and reducing a weight of the second rotating frame 4, and a receiving portion 47 extending from the third surface portion 41 towards the fourth surface portion 42 for receiving the rotor mechanism 20. The receiving portion 47 is configured for reducing the height of the rotating assembly 100 and comprises a bottom portion 471 and a surrounding wall 472 extending from the bottom portion 471 and connected with the third surface portion 41. The second rotating frame 4 further comprises a second rolling surface 46 extending from the bottom portion 471 of the receiving portion 47 towards the fourth surface portion 42. It is optional that the receiving slot can be omitted. A second rolling surface extends from the third surface portion 41 towards the fourth surface portion 42 and the rotor mechanism 20 is sandwiched between the first and third surface portions 61, 41 directly. In order to reduce the height of the rotating assembly 100 and retain the retainer unit 22, the arc length of the second rolling surface 46 is smaller than that of the first rolling surface 65. An outer diameter of the second rolling surface 46 is smaller than that of the first rolling surface 65. The first rolling surface 65 has a larger outer diameter, which makes the rotation of the rotors is stable and balanced. It's optional that the outer diameter of the first rolling surface is substantially same as that of the second rolling surface and/or the arc length of the second rolling surface is substantially same as that of the first rolling surface, as long as it can be used to allow the plurality of rotors being retained and rolling thereon.

In order to securely retain the second rotating frame 4 in the rotor chamber 54 in a rotatable manner while it is easy and fast to be assembled and disassembled, the second rotating frame 4 further comprises a circular locking lip 48. The second rotating frame 4 is able to be inserted in the rotor chamber 54 until the locking lip 48 snapped below the retaining lip 522 of the first rotating frame 3, so that the retaining lip 522 can retain and lock the second rotating frame 4 in the rotor chamber 54 in the rotatable manner with respect to the first rotating frame 3 unless manually pulling the second rotating frame 4 out from the rotor chamber 54 until the locking lip 48 being outwardly detached out of the retaining lip 522 in order to disassemble the rotating assembly 100. In an alternative embodiment, the locking lip can be a split-type and arranged spacedly and intervally with each other and the locking lip can be also a split-type, as long as at least one locking lip overlapped with the retaining lip when the first rotating frame is coaxially rotated with respect to the second rotating frame. The extending portion 52 of the first rotating frame 3 comprises an outer circumferential surface 523 arranged facing the inner circumferential surface 43 of the second rotating frame 4.

Figure 7:
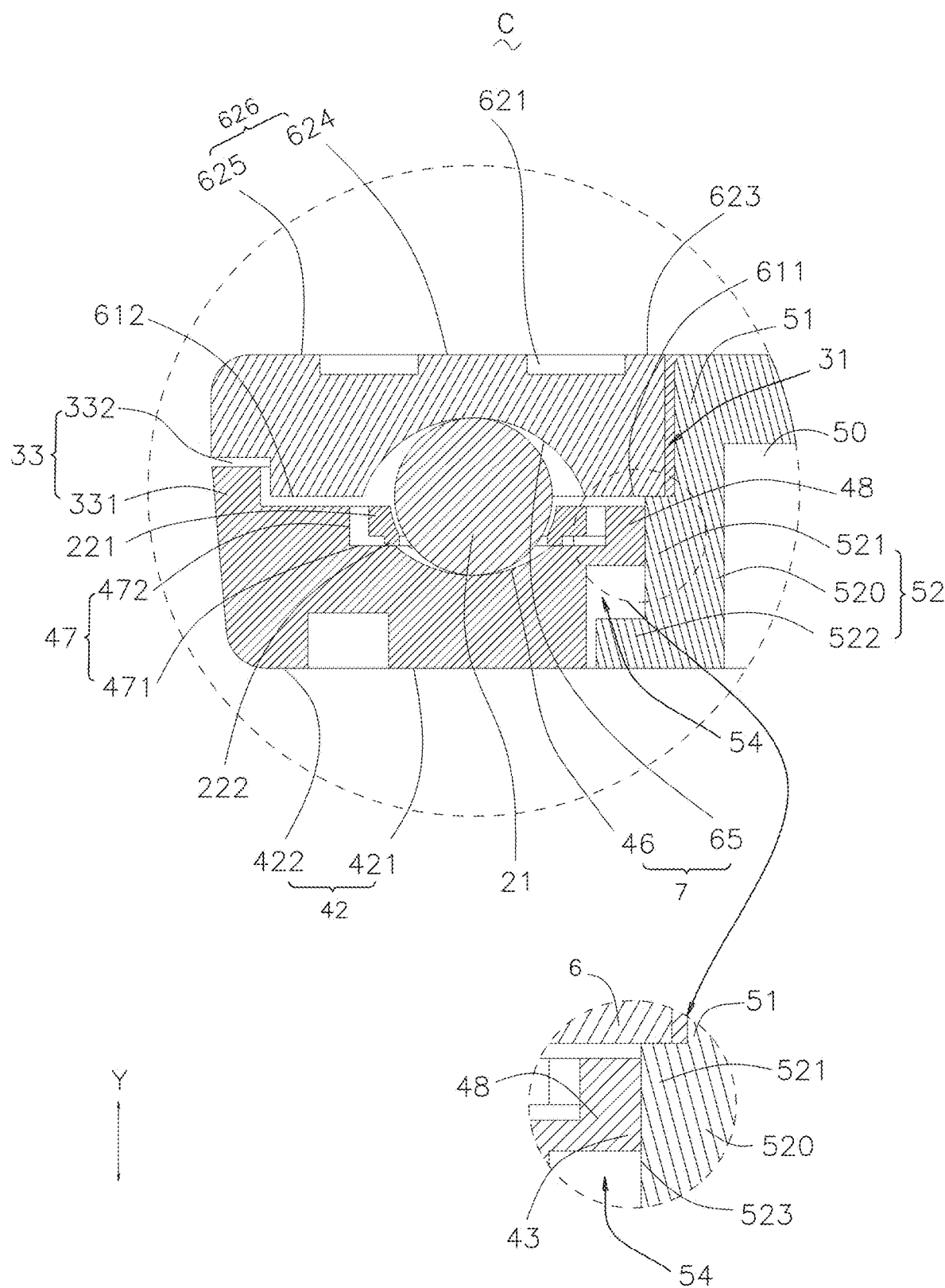
FIG. 7 is an enlarged view of Part C in FIG. 6.
Figure 8:
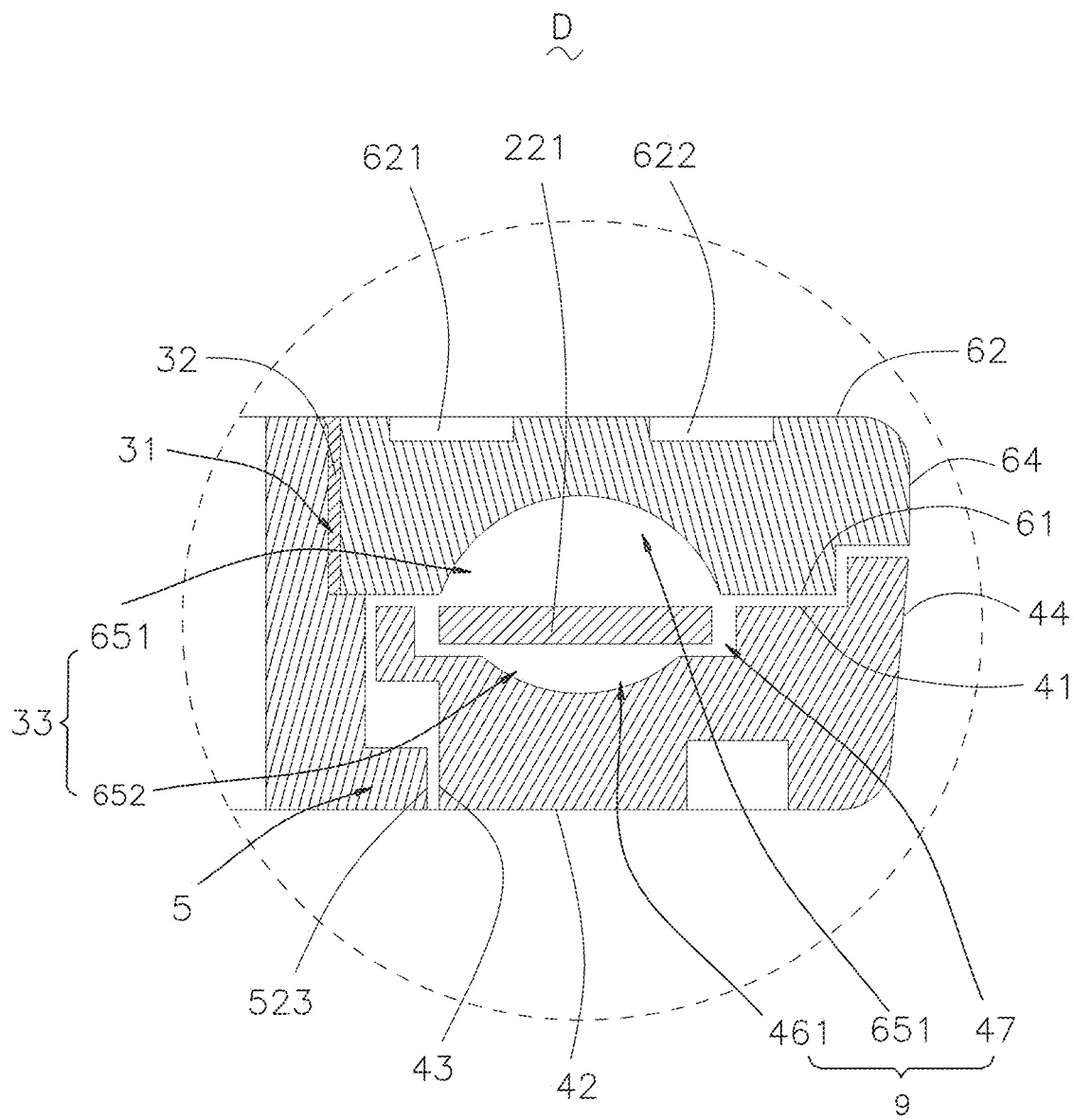
FIG. 8 is an enlarged view of Part D in FIG. 6.
Figure 9:
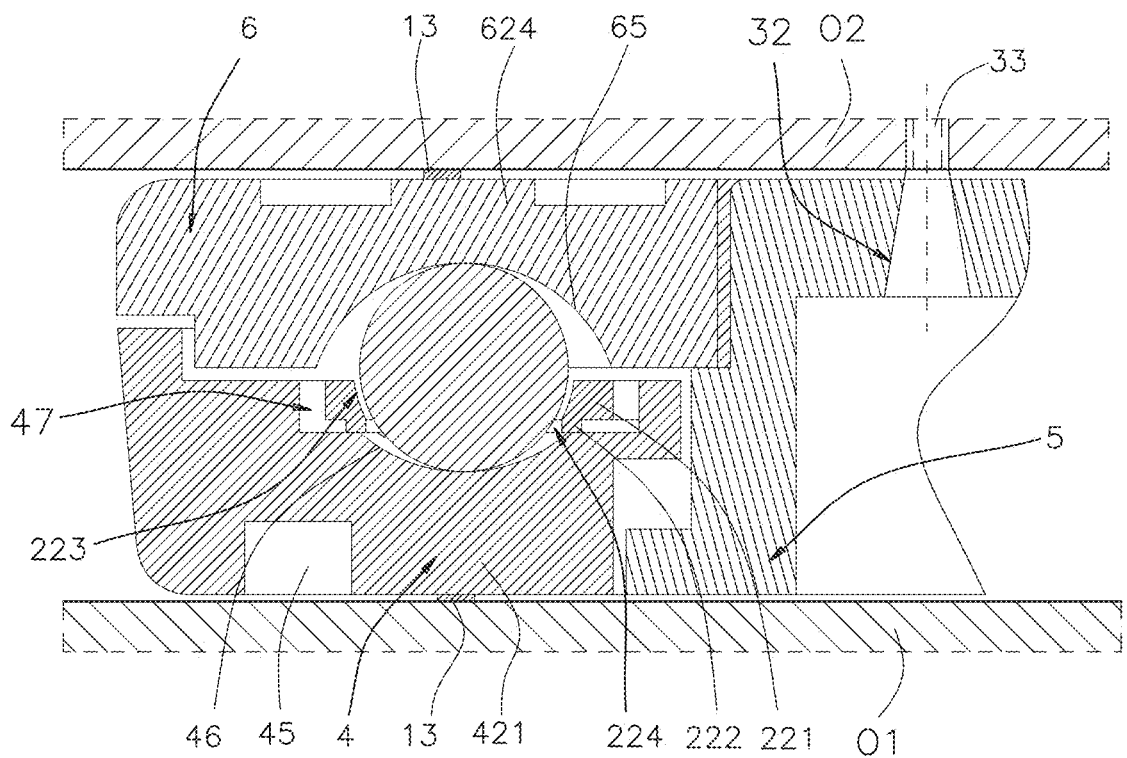
FIG. 9 is a partial sectional view illustrating the rotating assembly embedded between two objects according to the first embodiment of the present invention.

Referring to FIGS. 7-9, a diameter of the outer circumferential surface 523 is slightly smaller than that of the 523inner circumferential surface 43. In one usage state, when a part of the outer circumferential surface 523 is engaged with the corresponding inner circumferential surface 43, the other part of the outer circumferential surface 523 is spaced apart from the corresponding inner circumferential surface 43 along a rolling direction X. In another usage state, all of the outer circumferential surface 523 is fully spaced apart from the corresponding inner circumferential surface 43 along the rolling direction X.

In usage state, the outer circumferential surface 523 may be engaged with the inner circumferential surface 43 of the second rotating frame 4 via the rotors 21 to enable the first rotating frame 3 to be coaxially rotated with respect to the second rotating frame 4. Along a thickness direction Y of the rotating assembly 100, when the outer circumferential surface 523 provided on the engaging wall 521 is engaged with the inner circumferential surface 43 provided on the locking lip 48, the outer circumferential surface 523 provided on the retaining lip 522 may be engaged with the corresponding inner circumferential surface 43 of the second rotating frame 4 or not, as long as a part of the outer circumferential surface is engaged with the corresponding inner circumferential surface via the rotors 21 to effectively enable the first rotating frame 3 and the second rotating frame 4 being coaxially moved with each other. In an alternative embodiment, along the thickness direction Y of the rotating assembly 100, when the outer circumferential surface provided on the retaining lip is engaged with the corresponding inner circumferential surface of the second rotating frame, the outer circumferential surface provided on the engaging wall may be engaged with the inner circumferential surface provided on the locking lip or not, as long as a part of the outer circumferential surface is engaged with the corresponding inner circumferential surface via the rotors 21 to effectively enable the first rotating frame 3 and the second rotating frame 4 being coaxially moved with each other.

The frame body 10 further comprises a complementary conformation 33 for avoiding the first rotating frame 3 separating from the second rotating frame 4 during the rotation relative to each other and effectively retaining the rotor mechanism 20. The complementary conformation 33 comprises a projecting rib 331 provided on the second rotating frame 4 and projecting from the third surface portion 41 towards the second member 6 and a receiving slot 332 disposed at the second side 612, so that the projecting rib 331 is positioned into the receiving slot 332 with spacing, thereby receiving the rotor mechanism 20 to enable the first rotating frame 3 to be coaxially rotated with respect to the second rotating frame 4.

The second rolling surface 46 has a C-shaped cross section and the first rolling surface 65 also has a C-shaped cross section. The second rolling surface 46 is symmetrically positioned with respect to the first rolling surface 65 when the second rotating frame 4 is rotatably coupled with the first rotating frame 3. The second rolling surface 46 is cooperated with the first rolling surface 65 to form a ring-shape rolling track channel 9 therebetween. The first and second rolling surface 65, 4 have curvatures to function as the rolling track channel 9 to allow the rotors 21 directly rotatably disposed thereon. When the rotor mechanism 20 is received in the ring-shape rolling track channel 9 and enclosed by the first rotating frame 3 and the second rotating frame 4, the retainer unit 22 rotatably sits on the bottom portion 471 of the receiving portion 47 while the plurality of rotors 21 can be rotated between the first and second rolling surfaces 65, 46 smoothly and is able to be intervally revolving along the rolling track channel 9.

The retainer unit 22 is configured for spacedly retaining the rotors 21 in the rotatable manner, such that when the retainer unit 22 is coaxially held between the first rotating frame 3 and the second rotating frame 4, the rotors 21 are rotatably sandwiched between the first and second rolling surfaces 64, 46 so as to enable the first rotating frame 3 and the second rotating frame 4 being coaxially moved with each other. In this embodiment, the second member 6 of the first rotating frame 3 is rotatably mounted to the second rotating frame 4 by the rotors 21, thereby enabling the first object O1 to be rotated with respect to the second object O2. The retainer unit 22 is a substantially flat ring, which is a whole entirety ring and indivisible, and comprises a retaining ring 221, a plurality of retaining holes 223 drilled completely through the corresponding retaining ring 221, a plurality of retaining base 222 intervally and integrally protruded on one side of the retaining ring 221 and surrounding the corresponding retaining holes 223 for attaching on the bottom portion 471 of the receiving portion 47, a plurality of retaining openings 224 provided on the retaining base 222 and integrally and smoothly connected with the retaining holes 223. An upper surface of the retaining holes 223 is coplanar with that of the retaining ring 221. The diameters of the retaining holes 223 and retaining openings 224 are slightly greater than that of the corresponding rotors 21 for receiving the rotors 21 in a rollable manner. An outline of each retaining holes 223 is substantially same to that of the corresponding rotor 21 for effectively guiding the rotors 21 to rotate between the first and second rolling surfaces 65, 46 smoothly. It's optional that the diameter of each retaining openings is slightly smaller than that of the corresponding rotors for locking the plurality of rotors in position respectively while allowing the plurality of rotors in a free rolling manner.

The first and second rolling surfaces 65, 46 are coaxially positioned in a face to face manner to combine and the ring-shaped rolling track channel 9 is configured for retaining the plurality of rotors 21 therein in the rotatable manner. In other words, referring to FIGS. 7-9, the first rolling surface 65 is curved upwardly to form an annular upper concave 651 and the second rolling surface 46 is curved downwardly to form an annular lower concave 461. The upper and lower concaves 651, 461 are coaxially positioned in a face to face manner, such that the rolling track channel 9 is formed by the upper concave 651 cooperated with the lower concave 461 and the receiving portion 47. When the receiving portion is omitted. The rolling track channel 9 is formed by the upper concave 651 cooperated with the lower concave 461. According to the preferred embodiment, each of the plurality of rotors 21 of the rotor mechanism 20 has a ball shape and the retainer unit 22 is configured to intervally and spacedly retain the plurality of rotors 21 in the retaining holes 223 and retaining openings 224 in the rollable manner such that each of the plurality of rotors 21 is free to roll on both the first rolling surface 65 of the first rotating frame 3 and the second rolling surface 46 of the second rotating frame 4. In an alternative embodiment of the invention, the first rolling surface is curved downwardly to form an upper projecting portion projected from the first surface portion 61 away from the second surface portion 62 and the second rolling surface is curved upwardly to form a lower projecting portion projected from the third surface portion 41 away from the fourth surface portion 42.

It is appreciated that the rotating assembly 100 of the present invention is a standard product that can be applied to various configurations for allowing relative rotation between two surfaces of two objects. As shown in FIG. 9, the rotating assembly 100 is good for merely placed between a first contacting surface of a first object O1 and a second contacting surface of a second object O2. To increase friction between the rotating assembly 100 and the contacting surfaces of the first and the second objects O1, O2, the middle part 624 of the first rotating frame 3 and the pressing part 421 of the second rotating frame 4 provide a plurality of friction pads 13 intervally affixed thereon so that when the middle part 624 of the first rotating frame 3 and the pressing part 421 of the second rotating frame 4 are in contact with the first and second contacting surfaces of the first and second objects O1, O2 respectively, the friction pads 13 enhance relative friction therebetween and thus the weight of the upper object O1 or 2 substantially pressing down to ensure rotation of the upper object O1 or O2 rotating with respect to the lower object O1 or O2. For example, the first object O1 is a table and the second object O2 can be a puzzle board, a game board, an electrical appliance such as microwave, a dish platform, or etc. With the rotating assembly 100 of the present invention placed between the first and second objects O1, O2, the weight of the second object O2 presses against either the first rotating frame 3 or second rotating frame 4 (depending on whether the rotating assembly 100 is sat on the first object O1 with the first rotating frame 3 on top or the second rotating frame 4 on top) and ensures the position of the rotating assembly 100, so that the second object O2 is in rotatable state and is able to revolve along the axis of the rotating assembly 100 with respect to the first object O1 in stationary state.

In this embodiment, the first object is a puzzle board which is configured for a user or a player to assemble a plurality of puzzle pieces thereon. The second object is a playing surface such as a table surface, a wall surface, a floor surface, and the like for supporting the puzzle board on ground. The puzzle board has a panel configuration. The puzzle board is directly mounted on the middle part 624 of the first rotating frame 3 of the rotating assembly 100 and the pressing part 421 of the second rotating frame 4 is directly mounted on the playing surface, such that the rotating assembly 100 is sandwiched between the puzzle board and the playing surface and provides accessibility for the puzzle board 10 to move the puzzle board 10 at different planar directions with respect to the playing surface. In other words, the puzzle board is adapted for being self-rotated 360° on the playing surface via the rotation movement between the first rotating frame 3 and the second rotating frame 4.

The first part 623, the middle part 624 and the edge part 625 are coplanar with each other or the middle part 624 is projected from the first part 623 and the edge part 625 and closer to the second object O2 than the first part 623 and the edge part, so that the weight of the second object O2 is directly pressed onto the middle part 624 of the first rotating frame 3. The pressing part 421 and the outer rim 422 are coplanar with each other or the pressing part 421 is projected from the outer rim 422 and closer to the first object O1 than the outer rim 422, so that the reaction force generated from the first object O1 is directly applied on the pressing part 421 of the second rotating frame 4. In this embodiment, the weight of the puzzle board substantially pressing down on the playing surface through the rotating assembly 100. In other words, the weight of the puzzle board substantially pressing down on the rotors 21 through the middle part 624 via the first rolling surface 65 and the reaction force generated from the playing surface applied on the rotors 21 through the pressing part 421 via the second rolling surface 46, so that the second rolling surface 46 of the second rotating frame 4 is engaged and coupled with the first rolling surface 65 of the second member 22 via the rotors 21 to enable the second member 6 of the first rotating frame 3 being coaxially rotated with respect to the supporting frame 4. The rotors 21 are constantly contacted with the first and second rolling surfaces 65, 46 and free to roll on both of the first and second rolling surfaces 65, 46 to effectively enable the first rotating frame 3 and the supporting frame 4 being coaxially moved with each other. The middle part 624 of the first rotating frame 3 is opposite to the first rolling surface 65 and a projection of the middle part 624 is partly overlapped with that of the first rolling surface 65 in the thickness direction Y of the rotating assembly 100 for ensuring the weight of the upper object O1 or O2 is applied on the rotors 21 directly. The pressing part 421 is opposite to the second rolling surface 46 and a projection of the pressing part 421 is partly overlapped with that of the second rolling surface 46 in the thickness direction Y of the rotating assembly 100 for ensuring the reaction force generated from the playing surface (lower object O1 or O2) is applied on the rotors 21 directly. Therefore, the first rolling surface 65 of the first rotating frame 3 is engaged with the second rolling surface 46 of the second rotating frame 4 via the rotors 21 to enable the first rotating frame 3 to be coaxially rotated with respect to the second rotating frame 4.

Figure 2:
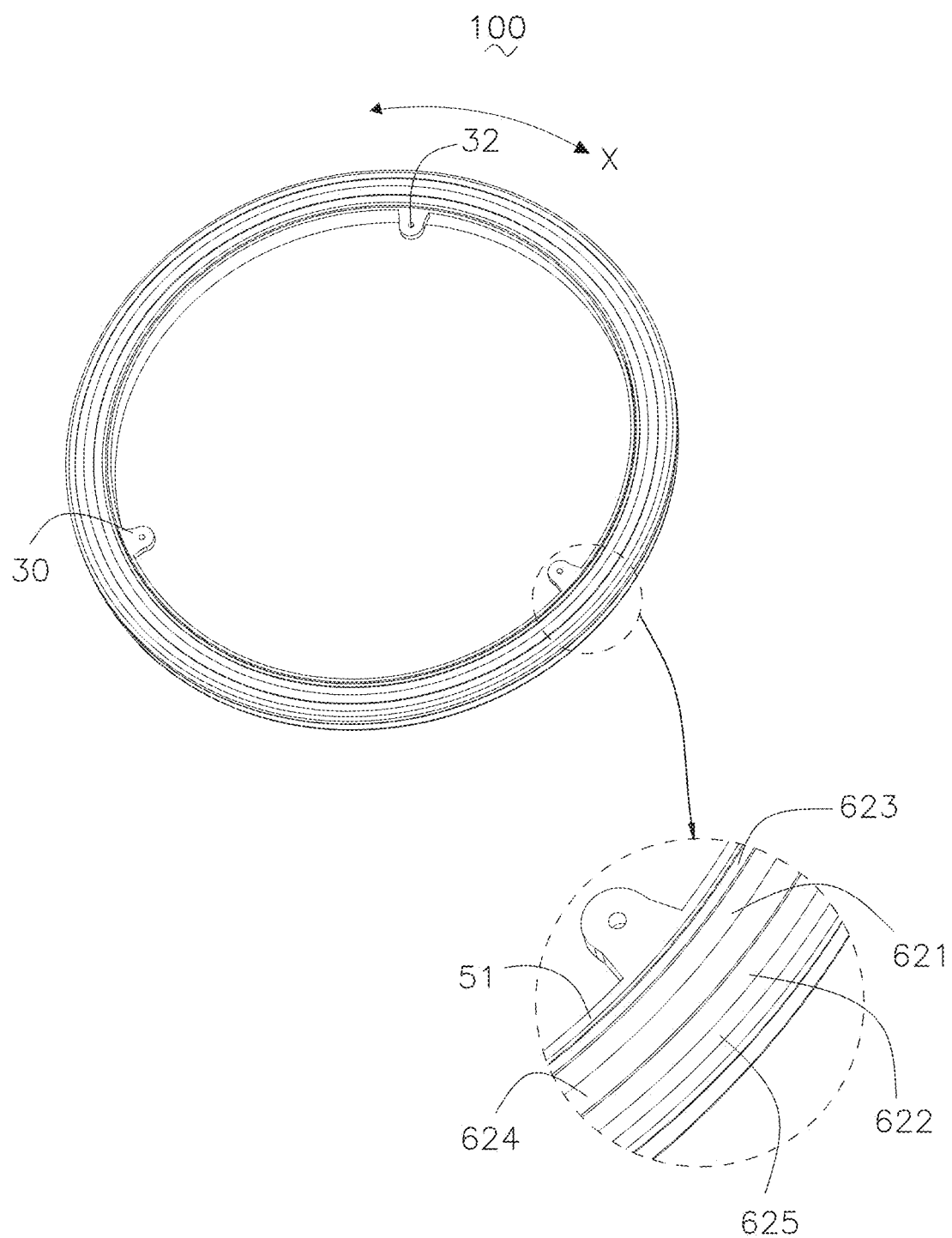
FIG. 2 is an illustrative isometric view of the rotating assembly shown in FIG. 1, but from another aspect.
Figure 3:
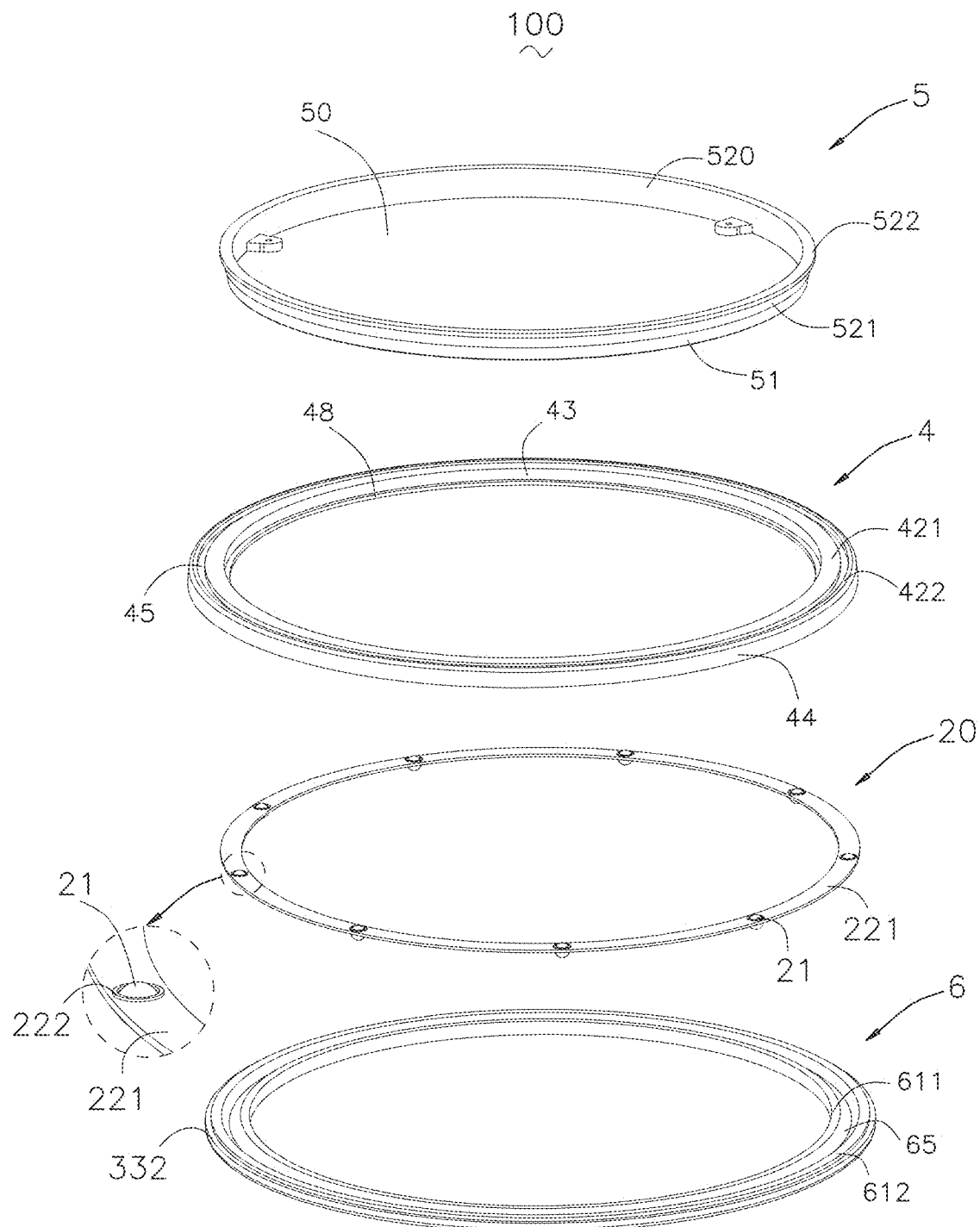
FIG. 3 is an exploded perspective view of the rotating assembly shown in FIG. 1.
Figure 4:
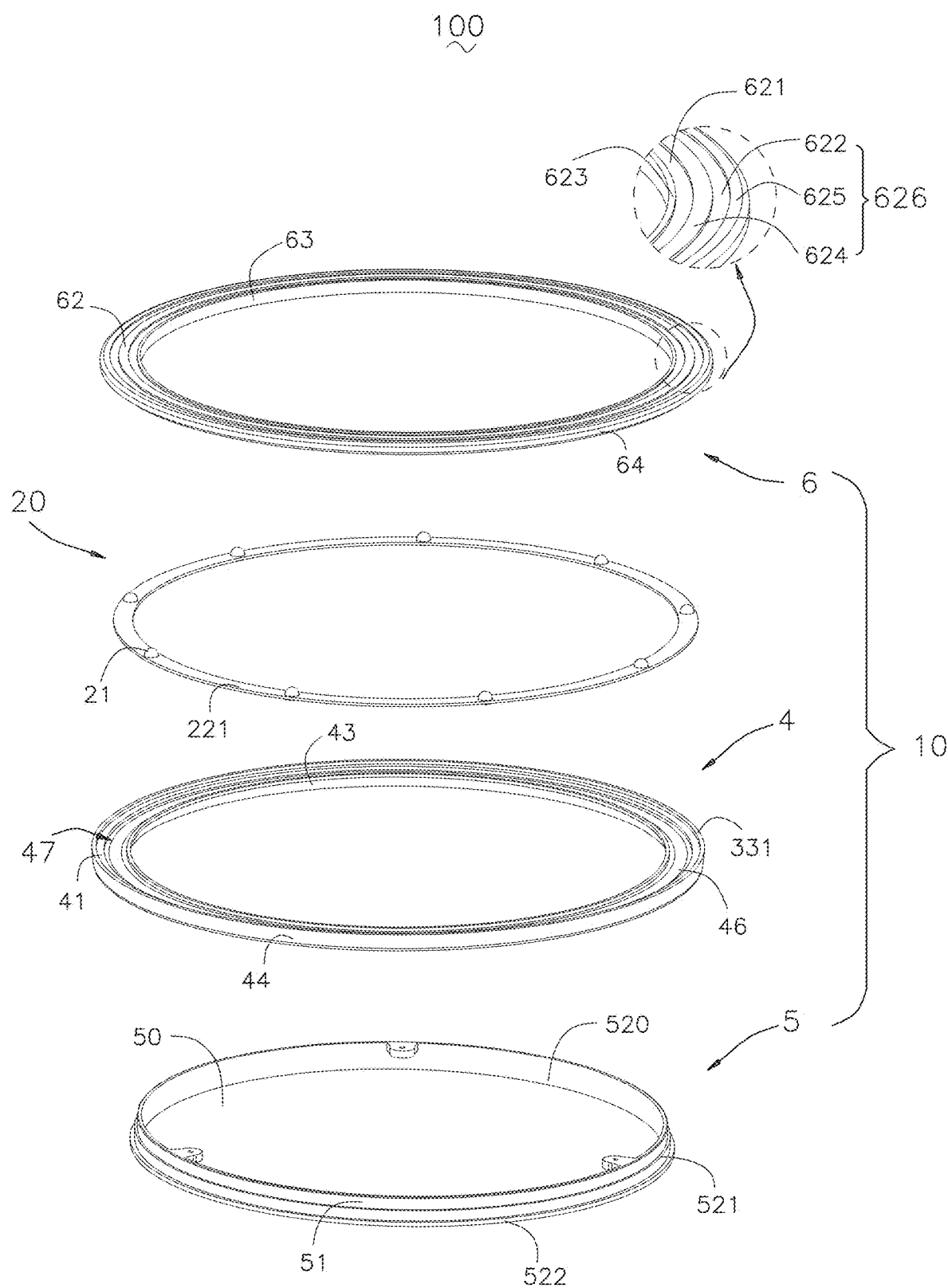
FIG. 4 is an exploded perspective view of the rotating assembly shown in FIG. 1, but from another aspect.
Figure 5:
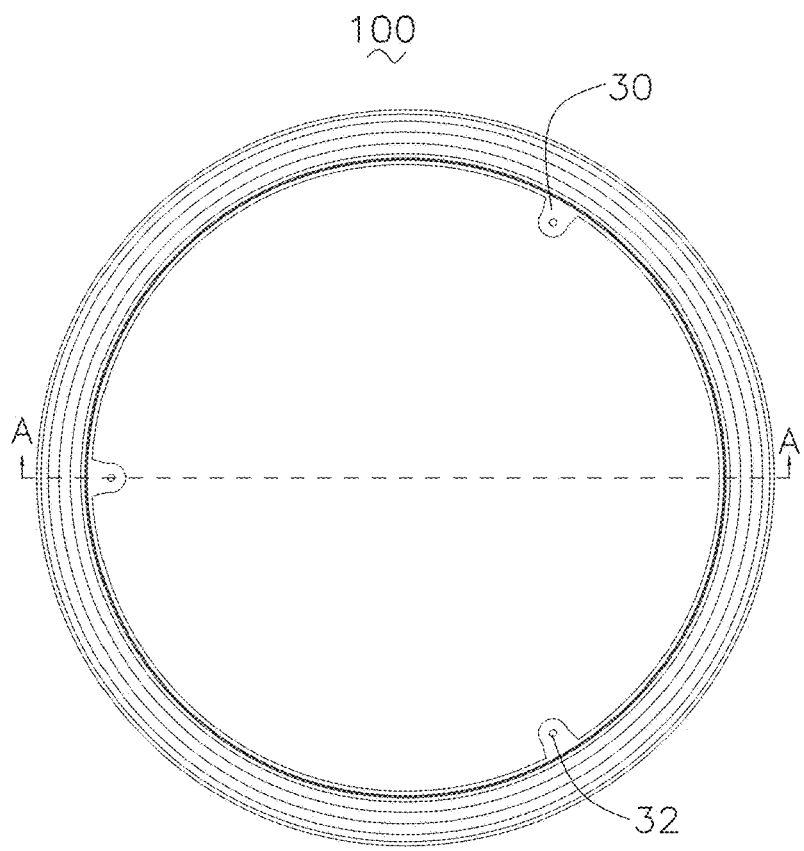
FIG. 5 is a front elevational view of the rotating assembly shown in FIG. 1.
Figure 6:
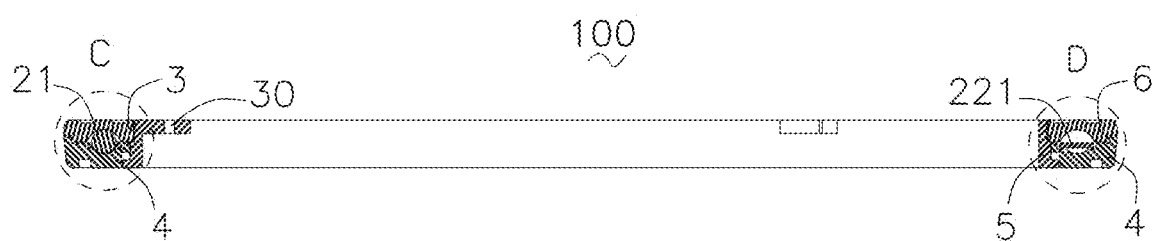
FIG. 6 is an enlarged cross-sectional view of the rotating assembly taken along line A-A of FIG. 5.

In order to further ensure a position of the rotating assembly 100 with one of the objects O1, O2 (for example the first object O1), the rotating assembly 100 of the present invention is preferred to further comprises a mounting device 30 for securely mounting the first rotating frame 3 to a surface of an object. According to the preferred embodiment, referring to FIGS. 1, 2 and 9, the mounting device 30 comprises a plurality of fixing elements 31 intervally extended from the fixing portion 51 of the first rotating frame 3. The plurality of fixing element 31 can be fastened to the fixing portion 51 of the first rotating frame 3. Preferably, the plurality of fixing elements 31 is integrally formed and extended from an upper edge of the fixing portion 51 of the first rotating frame 3 as shown in FIGS. 1-2 and FIG. 9, wherein each of the plurality fixing element 31 has a countersunk hole 32 therethrough for a screw 33 to fasten to the second object O2 as shown in FIG. 9. Therefore, the second object O2 supported on the first rotating frame 3 can be revolving with the first rotating frame 3 with respect to the second rotating frame 4 and the first object O1 about the axis of the rotating assembly 100. In addition, the distance between the first and second surfaces of the first and second objects O1, O2 is merely the thickness of the rotating assembly 100.

The frame body 10 is made of plastic, wood, or metal. When the frame body 10 is made of plastic by molding, the first rotating frame 3 has complicate structures and is preferred to be two-piece type, which is easy to mold the first and second members 5, 6, so that the manufacture of the rotating assembly 100 is simple and low-cost. In one alternative embodiment, the first rotating frame is a whole entirety and the first member is integral with the second member. If the frame body 10 is made of aluminum, the weight of the rotating assembly 100 can be reduced. If the frame body 10 is made of stainless steel or tempered steel, the structural strength of the rotating assembly 100 can be improved. If the frame body 10 is made of wood, the manufacturing cost of the movable puzzle platform 1 can be reduced.

FIGS. 13-17 show a rotating assembly 100' of a second embodiment of the present invention. The second embodiment of the present invention is similar to the first embodiment of the present invention except that a structure of rotor mechanism 20' comprising a plurality of rotors 21' each having a ball shape and a retainer unit 22' which comprises a plurality of dividers 22' each having a hollow elongated cylinder shape and a diameter smaller than the rotor 21'. The plurality of rotors 21' is spacedly arranged in a rolling track channel 9' defined by a first rolling surface 65' and a second rolling surface 46' and each of the plurality of dividers 221' is intervally disposed between two of the plurality of rotors 21' within the rolling track channel 9', such that the plurality of dividers 221' is able to divide the plurality of rotors 21' spacedly and intervally to ensure each of the plurality of rotors 21' is free to rolling along the rolling track channel 9'. To assembly, the plurality of rotors 21' and the plurality of dividers 221' of the retainer unit 21' are aligned and disposed on the second rolling surface 46' of the second rotating frame 4', and then cover the first rolling surface 65' of the first rotating frame 3' to enclose the plurality of rotors 21' and the plurality of dividers 221' therebetween. The diameters of the rotors 21' and are slightly greater than that of the dividers 221', so that the first rotating frame 3' is rotatably mounted to the second rotating frame 4' by the rotors 21' and the first rolling surface 65' of the first rotating frame 3' is coupled with the second rolling surface 46' of the second rotating frame 4' via the rotors 21' to enable the first rotating frame 3' to be coaxially rotated with respect to the second rotating frame 4'. The first rolling surface 65' is curved upwardly to form an annular upper concave 651' and the second rolling surface 46' is curved downwardly to form an annular lower concave 461'. The upper and lower concaves 461', 651' are coaxially positioned in a face to face manner, such that the rolling track channel 9' is formed by the upper concave 651' cooperated with the lower concave 461'.

In usage state, the adjacent rotors 21' or dividers 221' may be engaged with each other or spaced apart from each other as long as the rotors 21' are in constantly contact with the first and second rolling surfaces 65', 46' to effectively enable the first rotating frame 3' and the second rotating frame 4' being coaxially moved with each other. Particularly, an outer circumferential surface 520' of the first rotating frame 3' is engaged with an inner circumferential surface 43' of the second rotating frame 4' via the rotors 21' to enable the first rotating frame 3' being coaxially rotated with respect to the second rotating frame 4'.

In view of above, the rotating assembly of present invention has as less component as possible while providing relative strong and durable structure which can be equipped in various industrial products to allow relative rotation between two surfaces of two objects. Also, the rotating assembly has a relatively thin thickness for ease of mounting between two parallel surfaces ensuring one of the surfaces to turn about the other surface along an axis of the rotating assembly.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A rotating assembly comprising:
a first rotating frame having a first rolling surface;
a second rotating frame having a second rolling surface; and
a plurality of rotors coupled between the first rolling surface of the first rotating frame and the second rolling surface of the second rotating frame to enable the first rotating frame to be coaxially rotated with respect to the second rotating frame;
wherein the first rotating frame has a first member and a second member connected with the first member, the second rotating frame is arranged facing the second member with spacing for rotating related with the first rotating frame; and
wherein the first member comprises a fixing portion and the second member surrounding the fixing portion and connected with the fixing portion of the first member.

2. The rotating assembly, as recited in claim 1, wherein the first rotating frame further comprises an outer circumferential surface and the second rotating frame further comprises an inner circumferential surface engaged with the outer circumferential surface of the second rotating frame via the rotors to enable the first rotating frame to be coaxially rotated with respect to the second rotating frame.

3. The rotating assembly, as recited in claim 1, wherein the first rotating frame further comprises a receiving space formed by the fixing portion of the first member spaced apart from the second member for accommodating glue for fixing the first member and the second member firmly.

4. The rotating assembly, as recited in claim 3, wherein the first member further comprises an extending portion integrally extending from the fixing portion, the second rotating frame surrounding the extending portion of the first member for enable the first rotating frame being coaxially rotated with respect to the second rotating frame.

5. The rotating assembly, as recited in claim 4, wherein the extending portion comprises a supporting wall extending from the fixing portion and an engaging wall extending from the supporting wall and mounted on the second member.

6. The rotating assembly, as recited in claim 4, wherein the extending portion comprises a supporting wall extending from the fixing portion and a retaining lip extending from the supporting wall for forming a rotor chamber together with the supporting wall, the second rotating frame further comprises a locking lip received in the rotor chamber and locked by the retaining lip.

7. The rotating assembly, as recited in claim 1, further comprising a complementary conformation for retaining the rotors.

8. The rotating assembly, as recited in claim 7, wherein complementary conformation having a projecting rib provided on the second rotating frame and a receiving slot provided on the first rotating frame for receiving the projecting rib.

9. The rotating assembly, as recited in claim 1, wherein the first rotating frame has a flat middle part opposite to the first rolling surface and a projection of the middle part is partly overlapped with that of the first rolling surface in a thickness direction of the rotating assembly.

10. The rotating assembly, as recited in claim 1, wherein the second rotating frame has a flat pressing part opposite to the second rolling surface and a projection of the pressing part is partly overlapped with that of the second rolling surface in a thickness direction of the rotating assembly.

11. The rotating assembly, as recited in claim 1, further comprising a retainer unit for holding the rotors.

12. The rotating assembly, as recited in claim 11, wherein the retainer unit comprises a retaining ring, a plurality of retaining holes drilled completely through the corresponding retaining ring, a plurality of retaining base intervally and integrally protruded on one side of the retaining ring and surrounding the corresponding retaining holes, and a plurality of retaining openings provided on the retaining base and integrally and smoothly connected with the retaining holes.

13. The rotating assembly, as recited in claim 12, wherein the diameter of the retaining openings is slightly smaller than that of the corresponding rotors for locking the plurality of rotors in position respectively while allowing the plurality of rotors in a free rolling manner.

14. The rotating assembly, as recited in claim 11, wherein the first and second rolling surfaces form a rolling track channel for allowing the rotors directly rotatably disposed thereon, the retainer unit comprises a plurality of dividers configured to be received in the rolling track channel in such a manner that at least one of the rotors is placed between two of dividers so as to spacedly and intervally retain the rotor such that the rotor is free to roll on the first and second rolling surfaces.

15. The rotating assembly, as recited in claim 14, wherein diameters of the dividers are smaller than that of the rotors.

16. The rotating assembly, as recited in claim 14, wherein at least one of the dividers has a hollow elongated cylinder shape.

17. A rotating assembly, for being supportively disposed between a first object and a second object opposite to the first object for allowing the two objects rotating with respect to each other, comprising:
a frame body comprising a second rotating frame coupled at the first object and having a second rolling surface and a first rotating frame coupled at the second object and having a first rolling surface; and
a rotor mechanism coupled between the first and second rolling surfaces to enable the first rotating frame to be coaxially rotated with respect to the second rotating frame;
wherein the first rotating frame has a first member coupled to the second object and a second member connected with the first member, the second rotating frame is coupled with the first object and arranged facing the second member with spacing for rotating related with the first rotating frame; the first member comprises a fixing portion coupled to the second object and the second member surrounding the fixing portion and connected with the fixing portion of the first member; and
wherein the first rotating frame has a flat middle part opposite to the first rolling surface and the weight of the second object is directly pressed onto the middle part.

18. The rotating assembly, as recited in claim 17, wherein the first rotating frame is rotatably coupled to the second rotating frame by the rotor mechanism and comprises an outer circumferential surface and the second rotating frame further comprises an inner circumferential surface arranged facing the outer circumferential surface of the first rotating frame and engaged with the outer circumferential surface of the second rotating frame via the rotor mechanism to enable the first rotating frame to be coaxially rotated with respect to the second rotating frame.

19. The rotating assembly, as recited in claim 17, wherein the second rotating frame has a flat pressing part opposite to the second rolling surface and mounted on the first object.

20. A rotating assembly comprising:
   a first rotating frame having an upper concave with a first rolling surface;
   a second rotating frame having a lower concave with a second rolling surface; and
   a plurality of rotors coupled between the first rolling surface of the first rotating frame and the second rolling surface of the second rotating frame to enable the first rotating frame to be coaxially rotated with respect to the second rotating frame; and
   the first rotating frame further a fixing portion, a supporting wall extending from the fixing portion, an engaging wall extending from the supporting wall, a retaining lip extending from the supporting wall and spaced apart from the engaging wall for forming a rotor chamber together with the engaging wall, the second rotating frame further comprises a locking lip received in the rotor chamber and locked by the retaining lip.

21. The rotating assembly, as recited in claim 20, wherein the first rotating frame is rotatably coupled to the second rotating frame by the rotors and comprises an outer circumferential surface and the second rotating frame further comprises an inner circumferential surface arranged facing the outer circumferential surface of the first rotating frame and engaged with the outer circumferential surface of the second rotating frame via the rotors to enable the first rotating frame to be coaxially rotated with respect to the second rotating frame.

22. The rotating assembly, as recited in claim 20, wherein the first rotating frame has a first member and a second member connected with the first member, the second rotating frame is arranged facing the second member with spacing for rotating related with the first rotating frame, the rotor chamber is formed by the engaging wall, the retaining lip and the second member.

* * * * *